June 26, 1956 — F. K. VREELAND — 2,751,811
DIRECT READING ANALYTICAL SPECTROSCOPE
Filed Sept. 28, 1949 — 2 Sheets-Sheet 1
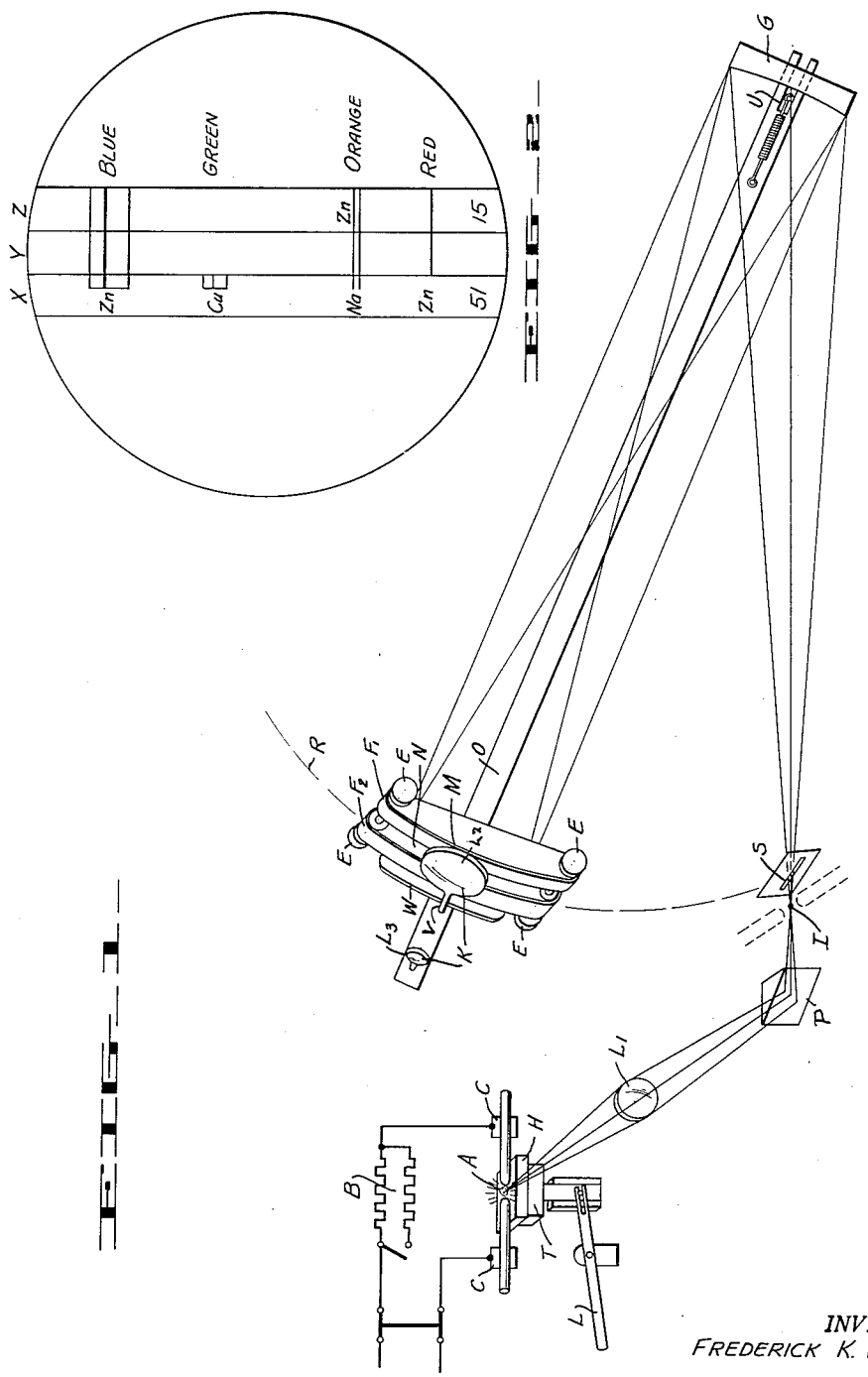
INVENTOR.
FREDERICK K. VREELAND
BY
Lippincott & Smith
ATTORNEYS.

June 26, 1956 F. K. VREELAND 2,751,811
DIRECT READING ANALYTICAL SPECTROSCOPE
Filed Sept. 28, 1949 2 Sheets-Sheet 2
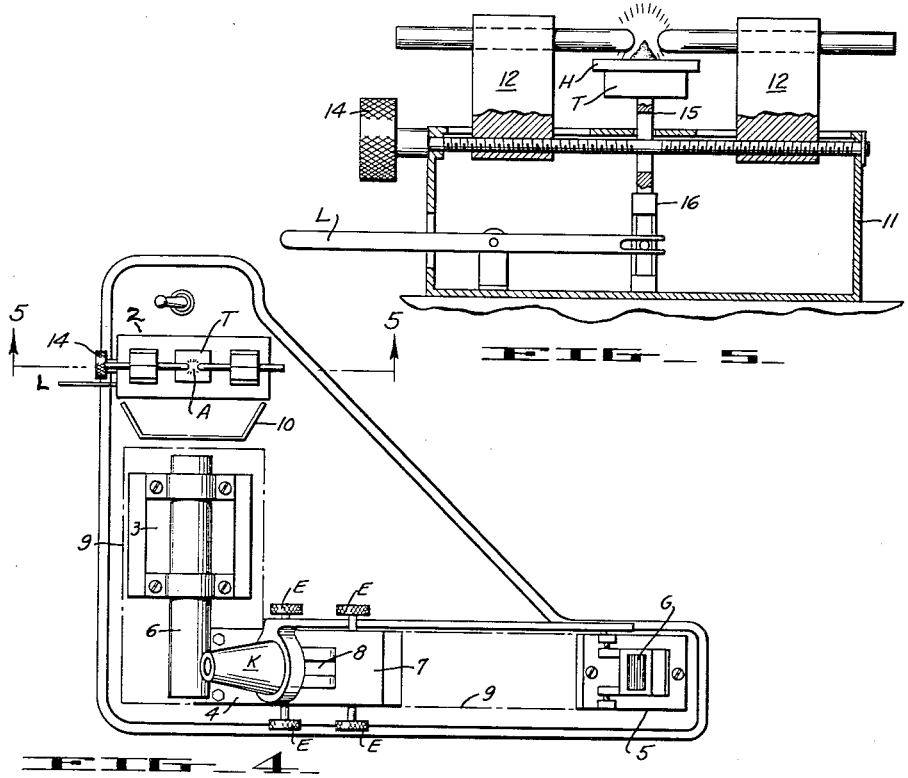
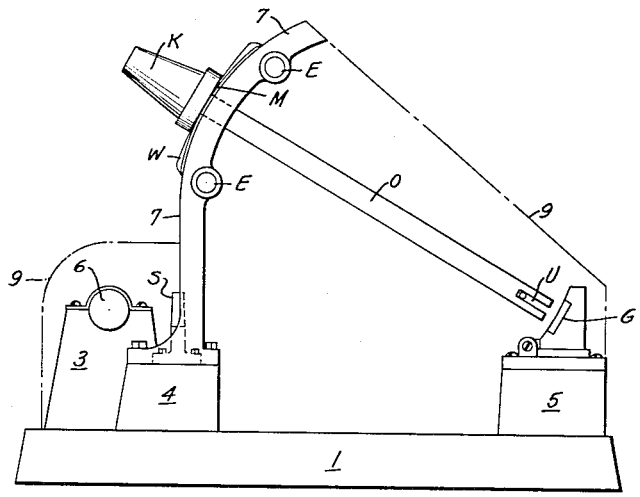
INVENTOR.
FREDERICK K. VREELAND
BY
*Lippincott & Smith*
ATTORNEYS.

United States Patent Office 2,751,811
Patented June 26, 1956

2,751,811

DIRECT READING ANALYTICAL SPECTROSCOPE

Frederick K. Vreeland, Mill Valley, Calif., assignor to Vreeland Corporation, Hoboken, N. J., a corporation of New Jersey Application September 28, 1949, Serial No. 118,352

8 Claims. (Cl. 88—14)

The invention herein described is apparatus for the spectroscopic analysis of materials.

A major object of the invention is to facilitate the identification of the constituent elements of a sample by comparison of the observed spectrum of a sample with standard spectrograms of the several elements. A further object is to facilitate the accurate placing of the standard spectrograms in juxtaposition with the observed spectrum so they may be compared directly and accurately. Another object is to permit the simultaneous comparison of a plurality of lines of the observed spectrum with the corresponding lines of a standard spectrogram. Another object is to illuminate the standard spectrograms in their true spectral colors. Another object is to derive the illumination of the standard spectrograms from the same source that excites the observed spectrum of the sample, and specifically to project a continuous spectrum derived from such source in juxtaposition with the observed spectrum of the sample. Another object is to provide a simplified optical system for simultaneously projecting a spectrum of the sample and a continuous spectrum in juxtaposition and in their true relative positions.

A further object is to control the excitation of the spectrum of a sample and particularly to cause the progressive excitation of the spectra of the several constituent elements and permit their successive identification. Another object is to utilize, stabilize and control the excitation of a sample by an alternating current arc. Other advantageous features are set forth herein.

In carrying out the invention the means employed for exciting the spectrum of a sample is preferably an electric arc, the gas column of which emits the characteristic radiation of the elements of the sample, which radiation is resolved into a line spectrum and projected in the field of view of the observer, while the electrodes of the arc are heated to incandescence and emit continuous radiation which is simultaneously projected as a continuous spectrum, also in the field of view of the observer and immediately adjacent to the line spectrum of the sample. An optical system is employed which projects the line spectrum and the continuous spectrum simultaneously and separately in juxtaposition and in their true mutual relations, without superimposing to impair the brilliancy of the line spectrum. The standard spectrograms are preferably recorded as positives on translucent photographic films and are placed adjacent to the line spectrum of the sample in the focal surface of the line spectrum and in the field of the continuous spectrum of an electrode, which illuminates the lines of the standard spectrogram in their true spectral colors. The opaque portions of the standard spectrograms mask the continuous spectra except on their transparent lines which are representative of the spectra of the several elements, and permit the passage of lines of light corresponding to the lines of the spectra of the corresponding elements. Preferably both continuous spectra of the two electrodes are utilized, on opposite sides of the line spectrum of the sample, so that the spectra of two elements may be matched by their respective standard spectrograms and identified simultaneously. The standard spectrograms are preferably recorded consecutively on continuous strips of film and means are provided for moving the films longitudinally so that the standard of any desired element may be selected and placed in juxtaposition with the observed spectrum for comparison, line by line. By this means the spectrum of a complex sample may be analyzed into its elemental components by comparison with successive standard spectrograms.

When a major constituent of a sample has a complex spectrum, it is convenient to place the standard spectrogram of that major constituent element on one side of the spectrum as an elimination film with its lines matched against the lines of the observed spectrum. Any lines that do not match are recognized as belonging to another element or elements, which are identified by comparison with their corresponding standard film or films. The instrument is thus direct reading and gives the analysis of a sample in terms of its constituent elements, without the measurement of wavelengths or reference to tables.

The standard spectrograms are preferably positive replicas of records made by recording photographically the spectra of the several elements as projected in an apparatus similar to that used for viewing the spectra and employing the same mode of excitation.

When illuminated by the continuous spectrum as described, such standard spectrograms correspond in the positions of the lines, their colors and their relative intensities to the actual appearance of the observed spectra of the corresponding elements. In the case of elements having intricate spectra the identification films are simplified to represent the appearance of the stronger lines when the element is present in small amount in the sample and the elimination films are made representing the appearance when the element is a major constituent. Thus the identification of each element in a sample is made quickly, easily and positively, and an approximate estimate of the amount present may be made.

For certain purposes the lines of the standard spectrogram may be inscribed mechanically. In such cases the lines are preferably inscribed on a large scale and reduced photographically to the scale of the projected spectra. In the case of the standard spectrogram of the index scale herein described, selected readily identifiable groups of lines characteristic of the lines of the spectra of a number of elements are preferably produced in this manner on the same strip of film. As used in this specification and claims the term "standard spectrogram" includes reference standards of either type, as well as those produced in any other manner which will permit a line-for-line comparison of the standard with any or all of the visible lines of a sample.

The correct registration of each standard spectrogram with the observed spectrum is assured by recording on each one a datum line or lines, such as the D lines of sodium, and the standard is positioned by matching these lines against the corresponding lines of the observed spectrum. The D lines are preferably employed, since they are very sensitive and nearly always visible in the spectrum of any sample or of the electrodes. By this means the matching of any line of a spectrum with the corresponding line of a standard spectrogram is accomplished with ease and precision. By the use of multiple coincidences the possibility of error is eliminated.

Identification of the lines of an unknown spectrum is facilitated by the use of an index scale as above described inserted in the strip of film with the complete standard spectrograms and having reference marks to the principal lines or line groups of the several elements, each with the distinguishing symbol of the corresponding element. When coincidences of spectral lines with any of the lines of the index scale are noted, the corresponding standard spectrogram is rolled into place and the identification completed by matching all the lines of the standard spectrogram with the lines of the observed spectrum.

In practicing the preferred method of applicant's invention an electric arc is formed. The characteristic radiation of a sample is excited by the arc. Continuous radiation is simultaneously produced by incandescence induced by the arc. A line spectrum of the sample and a continuous spectrum of the radiation produced by incandescence are projected simultaneously and in juxtaposition. The continuous spectrum is selectively filtered through transparent lines on an opaque background, placed in the path of the continuous radiation, whose relative positions correspond to the positions of the spectrum lines of a given element or elements, and positioned so that a datum line matches a corresponding line of the projected spectrum of an element of the sample, such as one or both of the D lines of sodium. When so filtered lines of light are selectively derived from the continuous spectrum having wavelengths characteristic of a given element. The lines thus selected constitute a synthetic optical replica of the spectrum of an element which is, to all intents and purposes, identical with the projected spectrum of such element in form, in substance and in color. The lines of the spectrum of a sample are thus compared directly with the lines selectively derived from the continuous spectrum, and the presence or absence of the element in the sample is determined by the coincidence or lack of coincidence of the lines selectively derived from the continuous spectrum with the lines of the projected spectrum of the sample.

In the drawing, Fig. 1 is a schematic diagram of a typical embodiment of the invention. Fig. 2 is a diagrammatic representation of a typical spectrum and the corresponding index scale and standard spectrogram as seen enlarged by the observer. Fig. 3 is an elevation and Fig. 4 a ground plan of a suitable structure embodying the invention. Fig. 5 shows details of the arc holder.

Referring to Fig. 1, A is an arc holder carrying electrodes C, C between which the arc is drawn. B is a ballast impedance for stabilizing the arc. Power is supplied to the arc through a switch from a suitable source. T is a table carrying an expendable refractory hearth H on which the sample is placed. The table is movably mounted to permit vertical adjustment controlled by a lever L, whereby the sample may be introduced into the arc gradually, permitting progressive excitation of its several constituent elements. The confusion resulting from the usual practice of applying full power to the sample at once, producing an intricate spectrum, is thus avoided.

The ballast B is shown as a generalized impedance and it may be a simple resistor, but when an alternating source is employed, as is preferred, the use of a reactive ballast gives greater stability, conserves power and reduces heat dissipation. The proximity of the hearth to the arc conserves heat during the periods of reversal and opposes extinguishing of the arc during reversal. The potential impulses applied when the current is reestablished after reversal give the arc a property of exciting atomic states of ionization producing lines commonly regarded as spark lines, which are useful in visual identification, in addition to the usual arc lines.

The optical system employed to produce a spectrum of the sample in juxtaposition with two continuous spectra by which the standard spectrograms are illuminated, includes a lens $L_1$, having a particular relation with the arc A, a slit S, a spectrum forming element which, in the arrangement shown, is a concave reflection grating G, and with an eyepiece K and a film holder M.

The optical axis including the arc, lens, slit and grating is preferably deflected through a right angle by a prism P, as shown. This gives the observer an unobstructed view of the spectrum, with the arc holder located conveniently in reach of one hand and the film positioning knobs E of the other. When the optical axis is referred to herein it will be understood that it may be deflected by the prism P as shown or the prism may be omitted without modifying the other features of the invention.

The lens $L_1$ is located in the optical axis, as thus defined, between the arc and the slit. Its focal length and position with respect to the arc and the slit are so determined that it has conjugate foci at the arc and at a point I in proximity with the slit, whereby an image of the arc and the tips of the electrodes is projected at the conjugate focal point I. The distance A, $L_1$ is preferably made less than the distance $L_1$, P, I so that a magnified image is projected. The arc space between the images of the electrodes may be of the order of three millimeters.

A concave diffraction grating is preferably employed to form the spectrum, though it will be understood that other equivalent spectrum-forming elements may be substituted without departing from the essential features of the invention. When a concave grating is employed, as shown at G, it is located in the optical axis, as herein defined, and so positioned that its primary focus is at the slit S, its secondary focus is substantially coincident with the image of the arc at I, and its diffraction focus is in an arc of the Rowland circle including the slit S and the grating G, at N. In the example illustrated in Fig. 1, the Rowland circle is shown in part by a broken line, R. A line spectrum of the arc and the sample excited thereby will then be projected in said arc of the Rowland circle and continuous spectra of the incandescent electrode tips will be simultaneously projected in juxtaposition with the arc spectrum. Since the slit is located at the primary focus of the grating, the spectral lines will be sharply defined. If the image of the electrode tips I is located at the secondary focus of the grating, as shown, the lines separating the line spectrum of the arc from the continuous spectra of the carbon tips will also be sharply defined. If the focal point I of the lens is not accurately at the secondary focus of the grating, the boundaries of the continuous spectra will be diffused. The width of the line spectrum between the two continuous spectra is approximately equal to the distance between the images of the electrode tips at I.

A film holder M is positioned with its outer curved face in the arc of the Rowland circle in which the lines of the arc spectrum are sharply defined. This curved face serves as a guide for the films $F_1$, $F_2$ on which the standard spectrograms are recorded, and the edges of the films bearing the spectral lines extend over the edges of the guide into a slot N through which the spectra are projected. The amount of overhang of the films is chosen to cover the whole width of the continuous spectra, by which the standard spectrograms are illuminated, leaving a space between the films through which the line spectrum of the arc is seen unobstructed and undimmed by the continuous spectra. The ends of the films are wound on spools turned by knobs E, whereby any desired standard spectrogram may be turned into the face of the film holder M and accurately positioned therein.

The positioning of the standard spectrograms is accomplished by recording on each standard a datum line or lines, preferably the D lines of sodium. The film is then adjusted by the knobs E so that the datum lines coincide with the adjacent D lines of the arc spectrum, as already explained. Since the standard spectrograms are made accurately to scale, the spectrum lines thereon of any other element will then be accurately in position for comparison with the lines of the projected spectrum. Since the lines of the standard spectrogram and those of the projected spectrum are compared end for end in a continuous line, the matching of one to the other may be done with great precision.

An eyepiece K is employed to view the spectrum and the standard spectrograms. The preferred form of eyepiece comprises a field lens $L_2$, located close to the spectrum and having a diameter sufficient to embrace a major part of the visible spectrum, with a smaller eye lens, the lenses in combination having a focal field close to the field lens. The focal field is made to coincide with the focal surface of the projected spectrum and the standard spectrograms at any position of the eyepiece by mounting the eyepiece on a swinging arm O having a slotted end U pivoted at a point near the grating G. The eyepiece is thus directed always toward the grating. The focal distance of the eyepiece is determined by a guide W having a curvature corresponding to the curvature of the spectrum and the film holder M. A projection V on the swinging arm O rides on the guide W and determines the focal position of the eyepiece in coincidence with the focus of the spectrum. There is thus no parallax error in comparing the lines of the spectrum with those of the standard spectrogram, and great precision of comparison may be accomplished. The projection V is preferably made integral with the support of the field lens, as shown.

The appearance of the spectrum and the standard spectrogram as seen in the eyepiece is shown in Fig. 2. The visible portions of the two strips of standard films are shown at X and Z. The projected spectrum appears between them in the space Y. The spectrum illustrated is that of zinc, and the standard spectrogram of zinc is shown at Z in position for comparison with the spectrum and is indicated by the symbol Zn, inscribed above the D lines. The coincidence of the zinc lines of the spectrum with the lines of the standard spectrogram is apparent. It will be understood that the horizontal lines of the drawing represent lines of light. In the space Y they are the lines of the projected spectrum. In the spaces X and Z they are lines of light selected from the continuous spectra and transmitted by the transparent parts of the standard spectrograms, when positive films are used. The rest of the continuous spectra is masked by the opaque portions of the films. Hence the lines of light thus selected may be compared directly with corresponding emission lines of the projected spectrum Y, which are in juxtaposition and substantially continuous therewith. In the band X is shown an index scale already described, incorporated in the film strip of the standard spectrograms and made to the same scale. The conspicuous line groups of the several elements inscribed on the index scale are indicated by the symbols of the elements. These symbols serve as a key for the selection of the appropriate standard spectrogram, each of which has a serial number, as shown. In the figure only three elements are shown on the index scale, for simplicity of illustration. It will be noted that the line group for copper appears on the index scale but is not matched by the spectrum.

A suitable structure embodying the invention is shown in elevation in Fig. 3 and in plan view in Fig. 4. In the figures, 1 is a base on which the structure is mounted, having pedestals 2, 3, 4 and 5 on which are mounted the arc holder A, an optical tube 6, the slit S and the grating G, respectively. The optical tube includes the lens L₁ and the prism P. The pedestals 4 and 5 are faced and grooved for the mounting and aligning of the slit and the grating. The pedestal 3 is machined with a seat for the optical tube 6, accurately at right angles with the grooves in pedestals 4 and 5. The arc holder A is fixed on the low pedestal or flat 2. 10 is an eye shield between the arc and the operator.

A sector 7 having a spectrum slot 8 is mounted on the pedestal 4, with feet straddling the slit S and its holder. The film holder M with its appurtenances is mounted in the spectrum slot 8 of the sector 7, with the knobs E protruding. Suitable screws and clamps are provided as shown permitting the correct positioning and alignment of the optical parts and fixing them permanently in position, and when thus positioned no further adjustment is required.

The whole assembly except the arc holder A and eye shield 10, the eyepiece and its mounting O, and the film control knobs, is enclosed in a casing 9, shown in broken lines. The slotted end U of the eyepiece mounting is pivoted in the casing and the upper end rides on the guide W on the film holder.

Structural details of the arc holder are shown in Fig. 5. It is made of insulating material and comprises a base part 11 with a slotted top. Electrode holders 12, 12 ride in the slots and are moved simultaneously by a right and left screw 13 operated by a knob 14. The hearth holder T is preferably a ceramic block mounted on a square metal rod 15 which slides vertically in a guide 16 and is positioned by a lever L pivoted on the base part 11. The expendable hearth H resting on the hearth holder T may thus be made to approach the arc at will, while the position of the arc is maintained in its correct relation with the optical system.

The appropriate electrical connections in the base will be understood.

It will be understood that these structural details are illustrative and the invention is not limited thereto.

I claim:

1. A spectroscope wherein are combined means for exciting and projecting the spectrum of a sample, a plurality of standard spectrograms of several elements arranged consecutively in a continuous strip, means for mounting said strip of spectrograms in juxtaposition with the position of said spectrum when projected, means for moving the strip in such juxtaposition whereby the standard spectrogram of any desired element may be selected and adjustably positioned in such juxtaposition, and means for observing the coincidence of lines in the projected spectrum with the corresponding lines of the standard spectrogram.

2. A spectroscope wherein are combined means for exciting and projecting the spectrum of a sample, means for simultaneously projecting a continuous spectrum in juxtaposition with the spectrum of the sample, and a translucent standard spectrogram mounted in juxtaposition with the position of the spectrum of the sample when projected and positioned for illumination by the continuous spectrum, whereby the lines of the standard spectrogram appear in their true spectral colors.

3. A spectroscope wherein are combined a pair of electrodes, means for drawing an electric arc between the electrodes, means for introducing a sample into the arc for excitation thereby, means for projecting a spectrum of the sample, means for simultaneously projecting a continuous spectrum of the incandescent tip of an electrode in juxtaposition with the projected spectrum of the sample, a standard spectrogram positioned for illumination by the continuous spectrum and means for comparing the lines of the illuminated standard spectrogram with the lines of the projected spectrum of the sample.

4. A spectroscope wherein are combined a pair of electrodes, means for drawing an electric arc between the electrodes, means for exciting a sample by the arc, a slit, optical means for projecting an image of the arc and the incandescent tips of the electrodes in proximity with the slit, optical means for projecting simultaneously a spectrum of the image of the arc and a continuous spectrum of the image of the incandescent tip of an electrode in juxtaposition with each other, a standard spectrogram representative of known spectral lines positioned for illumination by the corresponding wavelengths in the continuous spectrum, and means for comparing the spectrum of the arc with the illuminated standard spectrogram.

5. A spectroscope wherein are combined a pair of electrodes, means for drawing an arc between the electrodes, means for exciting a sample by the arc, a slit, a lens between the arc and the slit whose focal length and position with respect to the arc and the slit are so determined that it has conjugate foci at the arc and at a point in proximity with the slit, whereby an image of the arc and of the tips of the electrodes is projected at the point in proximity with the slit, a concave diffraction grating in the optical axis of the arc, the lens, the image of the arc and the slit and so positioned that its primary focal point is at the slit, its secondary focal point substantially coincident with the image of the arc, and its diffraction focus in the Rowland circle including the slit and the grating, whereby a spectrum of the arc and the sample excited thereby is brought to a focus in a focal surface defined by the Rowland circle and a continuous spectrum of the incandescent tip of at least one of said electrodes is simultaneously projected in juxtaposition therewith, and a standard spectrogram positioned in said focal surface for illumination by the continuous spectrum, whereby the lines of the spectrum of the arc may be compared with lines of the standard spectrogram.

6. A spectroscope wherein are combined a pair of electrodes, means for drawing an arc between the electrodes, means for exciting a sample by the arc, a slit, a lens between the arc and the slit whose focal length and position with respect to the arc and the slit are so determined that it has conjugate foci at the arc and at a point in proximity with the slit, whereby an image of the arc and of the tips of the electrodes is projected at the point in proximity with the slit, a concave diffraction grating in the optical axis of the arc, the lens, the image of the arc and the slit and so positioned that its primary focal point is at the slit, its secondary focal point substantially coincident with the image of the arc, and its diffraction focus in the Rowland circle including the slit and the grating, whereby a spectrum of the arc and the sample excited thereby is brought to a focus in a focal surface defined by the Rowland circle and a continuous spectrum of the incandescent tip of at least one of said electrodes is simultaneously projected in juxtaposition therewith, a standard spectrogram positioned in said focal surface for illumination by the continuous spectrum and an eyepiece positioned for viewing and comparing the lines of the spectrum of the arc with lines of the standard spectrogram.

7. A spectroscope wherein are combined a pair of electrodes, means for drawing an arc between the electrodes, means for exciting a sample by the arc, a slit, a lens between the arc and the slit whose focal length and position with respect to the arc and the slit are so determined that it has conjugate foci at the arc and at a point in proximity with the slit, whereby an image of the arc and of the tips of the electrodes is projected at the point in proximity with the slit, a concave diffraction grating in the optical axis of the arc, the lens, the image of the arc and the slit and so positioned that its primary focal point is at the slit, its secondary focal point substantially coincident with the image of the arc, and its diffraction focus in the Rowland circle including the slit and the grating, whereby a spectrum of the arc and the sample excited thereby is brought to a focus in a focal surface defined by the Rowland circle and a continuous spectrum of the incandescent tip of at least one of said electrodes is simultaneously projected in juxtaposition therewith, a standard spectrogram positioned in said focal surface for illumination by the continuous spectrum, and an eyepiece comprising a field lens located close to said focal surface and having a diameter sufficient to embrace a major part of the visible spectrum, with a smaller eye lens, the lenses in combination having a focal point close to the field lens.

8. A spectroscope wherein are combined means for exciting and projecting the spectrum of a sample, means for mounting a plurality of standard spectrograms of several elements arranged consecutively in two continuous strips in juxtaposition with and on opposite sides of the position of said spectrum when projected, means for moving one strip in such juxtaposition whereby the standard spectrogram of one element of the sample may be selected and its lines matched against the corresponding lines of the rojected spectrum, and means for moving the other strip whereby the standard spectrogram of another element may be selected and adjustably positioned for comparison with the otherwise unmatched lines of the projected spectrum.

References Cited in the file of this patent

UNITED STATES PATENTS

| | | |
|---|---|---|
| 1,902,109 | Twyman | Mar. 21, 1933 |
| 2,043,053 | Martin | June 2, 1936 |
| 2,206,344 | Borchardt | July 2, 1940 |
| 2,279,646 | Smith | Apr. 14, 1942 |
| 2,282,643 | Cutting | Mar. 12, 1942 |
| 2,309,301 | Burr | Jan. 26, 1943 |
| 2,344,719 | Nusbaum et al. | Mar. 21, 1944 |
| 2,346,512 | Scribner et al. | Apr. 11, 1944 |
| 2,417,489 | Hasler et al. | Mar. 18, 1947 |
| 2,420,077 | Hasler et al. | May 6, 1947 |
| 2,431,734 | Cutting | Dec. 2, 1947 |

OTHER REFERENCES

Baly: "Spectroscopy," volume I, third edition, 1924, published by Longmans, Green & Co., pages 125, 165, 201.

Nitchie, C. C.: Article in Ind. Eng. Chem., Anal. Ed., vol. 1, pages 1–7, 1929.

Sawyer: "Experimental Spectroscopy," published by Prentice-Hall, Inc., 1942, pages 130, 149.

Harrison, G. R., et al.: "Practical Spectroscopy," published in 1948 by Prentice-Hall, Inc. New York, N. Y., pages 46, 47, 205, 180, 181, 200, 201.